3,038,927
3-CHLORO-2,2-DINITRONORBORNANE COMPOUNDS AND PROCESS OF PREPARING SAME
Jerry Blair Miller, Wilmington, Del., assignor to E. I. du Pont de Nemours and Company, Wilmington, Del., a corporation of Delaware
No Drawing. Filed Apr. 24, 1961, Ser. No. 104,831
12 Claims. (Cl. 260—464)

This invention relates to new organic compounds. More particularly it relates to 3-chloro-2,2-dinitronorbornanes and to their preparation.

It is well recognized that replacement of a condenser impregnant by another material having a higher dielectric constant, in addition to suitable physical and other characteristics, offers a considerable savings in space and material by providing a higher over-all capacitance per unit volume of the dielectric material. It is also known that in a conventional electroluminescent cell, the higher the dielectric constant of the matrix or dielectric binder relative to the phosphor, the more the electric field will be concentrated across the phosphor crystals and the greater will be the amount of light produced for the same voltage, phosphor, and cell construction.

An object of this invention is to provide new 3-chloro-2,2-dinitronorbornane compounds. A further object is to provide such compounds which have high dielectric constants. A still further object is to provide such compounds which improve the dielectric properties of mixtures. Other objects will be apparent from the following description of the invention.

The new 3-chloro-2,2-dinitronorbornanes of this invention are represented structurally by the formula:

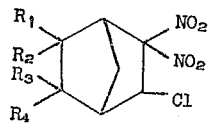

wherein $R_1$, $R_2$, $R_3$ and $R_4$ are members selected from the group consisting of hydrogen, chlorine, fluorine, cyano, alkyl, e.g., of 1 to 6 carbon atoms, alkoxycarbonyl and one of said members $R_1$ and $R_2$ and one of said members $R_3$ and $R_4$ when taken together form an alkylene group of 3 to 6 carbon atoms, the other member of $R_1$ and $R_2$ and $R_3$ and $R_4$ being hydrogen.

The novel process by which the novel compounds of this invention are prepared employs a norbornene compound such as is described below as a starting material. Chloronitrosation with a reagent such as nitrosyl chloride converts the norbornenes to dimeric 3-chloro-2-nitrosonorbornane derivatives which in turn are transformed by nitration and oxidation, e.g., with nitric acid, nitrogen dioxide, etc., to the 3-chloro-2,2-dinitronorbornane products.

The invention will be further illustrated by but is not intended to be limited to the following examples which describe more fully the novel compounds and their preparation. The quantities stated in the examples are parts by weight unless otherwise designated.

EXAMPLE I (A) *Preparation of 3-Chloro-2,2-Dinitronorbornane*

Nitrosyl chloride is added with rapid stirring to a solution of 94 parts of norbornene in 750 parts of glacial acetic acid until the solution retains a permanent nitrosyl chloride color. During the addition, the temperature is maintained at about room temperature and dimeric 3-chloro-2-nitroso-norbornane separates as a solid. Concentrated nitric acid (500 parts) is added to the reaction mixture and the mixture is heated slowly to reflux. Refluxing is continued for two hours, during which period the solution becomes light yellow. The solution is allowed to cool and is poured into 4000 parts of water. The resulting mixture is stirred for several hours, a light yellow waxy solid of crude 3-chloro-2,2-dinitronorbornane separating out. The product is washed successively with water, 5% sodium bicarbonate solution, 5% sodium hydroxide solution and again with water. The remaining solid is dissolved in carbon tetrachloride and further purified by extraction in succession with concentrated sulfuric acid, "cleaning solution" (a mixture of 10 parts of sodium dichromate dihydrate, 10 parts of water and 368 parts of concentrated sulfuric acid), concentrated sulfuric acid, water, 5% sodium bicarbonate solution, and finally with 5% sodium hydroxide solution. Little or no color is removed in the final wash. The carbon tetrachloride solution is then dried with calcium chloride and filtered, and the solvent is removed under reduced pressure. The product is a yellowish, waxy solid, identified by analysis as 3-chloro-2,2-dinitronorbornane.

(B) *Alternate Procedure for Preparation of 3-Chloro-2,2-Dinitronorbornane*

A solution of 25 parts of dimeric 3-chloro-2-nitrosonorbornane (prepared by saturating norbornene with nitrosyl chloride as in procedure A), 0.5 part of sodium nitrite and 355 parts of concentrated nitric acid is refluxed for 5 hours or until the evolution of nitrogen oxides is no longer apparent. The solution is cooled to room temperature and diluted with 500 parts of water. The mixture is allowed to stand overnight, during which time a waxy solid separates. The solid is filtered, washed with water, 5% sodium bicarbonate solution, and again with water until the washings are neutral. The product is air dried and dissolved in a minimum of a 1:1 petroleum ether/carbon tetrachloride mixture. The solution is chromatographed on an alumina column. The eluate collected upon elution of the column with 3:1 petroleum ether/carbon tetrachloride is discarded. The eluate from elution with 1:1 petroleum ether/carbon tetrachloride is collected and evaporated at reduced pressure, yielding an oily solid. The solid is dissolved in ether and the ether is evaporated. After repeating the solution-evaporation procedure several times, the solid is sublimed at 80° C. under 2 mm. pressure. The yellowish solid has an indistinct melting point, 99–149° C. in a sealed tube, but is completely liquid at 150° C.

(C) *Alternate Procedure for Preparation of 3-Chloro-2,2-Dinitronorborane*

Procedure B is repeated except that the concentrated nitric acid is replaced by acetic acid saturated with nitrogen dioxide.

Analyses of the compositions obtained by the above procedures were consistent with the composition $$C_7H_9ClN_2O_4$$

*Analysis.*—Calc. for $C_7H_9ClN_2O_4$: C, 38.11; H, 4.11; Cl, 16.07; N, 12.70; O, 29.01. Found: C, 37.68, 38.38, 38.32; H, 4.08, 4.38, 4.36; Cl, 16.37, 15.74, 15.42; N, 12.68, 12.51, 12.65; O, 28.59.

The compositions were further identified spectrophotometrically as 3-chloro-2,2-dinitronorborane. The molecular weights (cryoscopic) were determined for compositions prepared by procedures A and B as 214 and 218, respectively. 3-chloro-2,2-dinitronorborane sublimes under vacuum, has a dielectric constant of about 30 at 25° C. and 1000 cycles per second and has a dissipation factor of $9 \times 10^{-4}$. The compound is easily pressed into clear pellets and films.

EXAMPLE II

*Preparation of 3,5(or 3,6)Dichloro-2,2-Dinitronorbornane*

5-chloronorbornane (50 parts) is cooled to below 20° C. and nitrosyl chloride is bubbled through the stirred liquid until a thick slurry results. Ethanol is added and the mixture is heated to boiling and is filtered. A white powder, identified as the 3,5(or 3,6)dichloro-2-nitrosonorbornane dimer is obtained. The product melts over the range 148–154.8° C. with decomposition.

The nitroso dimer (11 parts) is added to a mixture of 142 parts of concentrated nitric acid and 0.2 part of sodium nitrite. Upon heating slowly to reflux, the mixture foams extensively. Refluxing is continued until the mixture is homogeneous and oxides of nitrogen are no longer evolved. The mixture is cooled to 60° C. and is then poured over 500 parts of ice. The precipitate is filtered, washed successively with water, 5% sodium bicarbonate solution, 5% sodium hydroxide solution and finally with water until the washings are neutral. The solid is dissolved in benzene, and alumina is added to the solution. The mixture is stirred and filtered, and the solvent is removed from the filtrate under vacuum. The residue is dissolved in carbon tetrachloride and the alumina treatment is repeated twice. The final filtrate is colorless. The solvent is removed under vacuum, yielding a partially crystalline oil. The oil is triturated with petroleum ether, a white solid being obtained. The solid is sublimed under oil pump vacuum at 85° C., and the sublimate is recrystallized from ethanol/water and dried under vacuum over phosphorus pentoxide. The product melts over the range 164.4–165.0° C. Analyses are consistent with the composition $C_7H_8Cl_2N_2O_4$ and spectrophotometric data support the following structure:

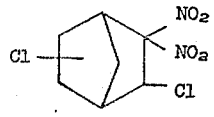

*Analysis.*—Calc. for $C_7H_8Cl_2N_2O_4$: C, 32.96; H, 3.16; Cl, 27.80; N, 10.98; O, 25.09. Found: C, 33.02; H, 3.21; Cl, 28.58; N, 10.53; O, 24.25.

EXAMPLE III

*Preparation of 3-Cis-Endo-5,6-Trichloro-2,2-Dinitronorbornane*

Cis-endo-5,6-dichloronorbornene (7.22 parts) is dissolved in 37 parts of chloroform and the solution is saturated with nitrosyl chloride. After standing about one hour, crystals of 3-cis-endo-5,6-trichloro-2-nitrosonorbornane dimer are filtered from the mixture and washed with ethanol. The crystals melt over the range 175–176° C. with decomposition.

A mixture of the nitroso adduct and 71 parts of concentrated nitric acid is heated to reflux with stirring. Acetic acid (20 parts) is added and the mixture is refluxed for 3 hours. The mixture is then poured into water and allowed to stand overnight. The solid product is filtered, washed in succession with 5% sodium bicarbonate solution, 5% sodium hydroxide solution and water, and dried. The dried solid is dissolved in chloroform and extracted successively with concentrated sulfuric acid, the "cleaning solution" described in Example IA, water, 5% sodium bicarbonate solution, 5% sodium hydroxide solution, and water, until the chloroform solution is colorless. The chloroform solution is dried with calcium chloride and the solvent is evaporated. The solid is redissolved in a 4:1 carbon tetrachloride-benzene mixture and chromatographed on alumina. Elution with the 4:1 carbon tetrachloride-benzene mixture followed by benzene alone and evaporation of the combined eluate gives colorless crystals which are further purified by subliming under vacuum at 100° C. The crystals melt over the range 175.6–178.8° C. in a sealed tube. Analyses are consistent with the compound, 3-cis-endo-5,6-trichloro-2,2-dinitronorborane having the empirical formula $C_7H_7Cl_3N_2O_4$ and structurally represented by

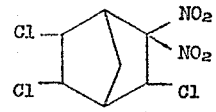

*Analysis.*—Calc. for $C_7H_7Cl_3N_2O_4$: C, 29.04; H, 2.44; Cl, 36.74; N, 9.68; O, 22.11. Found: C, 29.04, 29.16; H, 2.55, 2.60; Cl, 37.38, 37.44; N, 9.42, 9.39; O, 21.29, 21.43, 21.42.

EXAMPLE IV

*Preparation of 3-Trans-5,6-Trichloro-2,2-Dinitronorbornane*

A solution of 12.9 parts of trans 5,6-dichloronorbornene in 37 parts of chloroform is saturated with nitrosyl chloride. After one hour, the solution is filtered and the solid is washed with ethanol. The product, identified as 3-trans-5,6-trichloro-2-nitrosonorbornane dimer, melts with decomposition over the range 159–167° C. The nitrosyl chloride adduct is boiled with 70 parts of concentrated nitric acid until a homogeneous, slightly yellow solution results. After cooling to room temperature, the solution is poured into water. The aqueous mixture is extracted with benzene, and the benzene extract is washed with 5% sodium bicarbonate solution and dried with sodium sulfate. A heavy liquid remains when the solvent is removed. The liquid is dissolved in benzene and an equal volume of carbon tetrachloride is then added. This solution is chromatographed on alumina employing an eluting agent of carbon tetrachloride/benzene (4/1). White, sticky crystals form when the solvent is removed from the eluate under reduced pressure. The crystals are purified by subliming under vacuum at 100° C. and the sublimate is recrystallized from petroleum ether/benzene. The product, identified by analyses as 3-trans-5,6-trichloro-2,2-dinitronorbornane, melts over the range 129.3–133° C.

*Analysis.*—Calc. for $C_7H_7Cl_3N_2O_4$: C, 29.04; H, 2.44; Cl, 36.74; N, 9.68; O, 22.11. Found: C, 29.57, 29.64; H, 2.58, 2.72; Cl, 36.77; N, 9.76; O, 21.28, 21.15.

EXAMPLE V

*Preparation of 3-Chloro-5(or 6)-Hexyl-2,2-Dinitronorbornane*

A solution of 62 parts of 5-hexylnorbornene in 298 parts of chloroform is saturated with nitrosyl chloride. The solvent is removed under reduced pressure at room temperature and a viscous, black oil remains. The black oil is cooled in an ice bath and 70 parts of nitric acid is added in three portions. The mixture is then allowed to stir at room temperature for one hour. To the oil are added 70 parts of concentrated nitric acid and 100 parts of acetic acid, and the mixture is refluxed until the liquid becomes slightly yellow. The liquid is poured onto ice and the mixture is extracted with chloroform. The chloroform extract is washed with 5% sodium bicarbonate solution and 5% sodium hydroxide solution. The chloroform solution is dried twice with sodium sulfate and diatomaceous earth (e.g., Celite) and once with alumina and filtered. The dark-colored solution is dissolved in carbon tetrachloride and passed through an alumina column. The column is eluted with carbon tetrachloride and the eluate, on evaporation, yields a light yellow, viscous liquid. The viscous liquid is dissolved in carbon tetrachloride and stirred with a solution of 5 parts of sodium borohydride in 100 parts of water. The carbon tetrachloride layer is separated and treated with fresh sodium borohydride solution. The organic layer is separated and washed with water. A very stable emulsion is formed which is broken by cautious addition of sulfuric acid. The organic layer is then washed twice with concentrated sulfuric acid. Further washing with a 10% sulfuric acid solution saturated with potassium permanganate gives a stable pink emulsion which is also broken by concentrated sulfuric acid. Final washings are with "cleaning solution" as described in Example IA and with water. The solution is dried with calcium chloride, becoming orange, and decolorizing upon contact with alumina. The solution is filtered and the filtrate is evaporated under reduced pressure to give a slightly viscous liquid, $n_D^{25}=1.487(9)$, $d=1.220$ g./cm.$^3$, and molecular refractivity=71.9. The liquid is dried under oil pump vacuum over phosphorus pentoxide for 2 hours at 80° C. and then 14 hours at room temperature. Analyses are consistent with the composition 3-chloro-5(or 6)-hexyl-2,2-dinitronorbornane having an empirical formula $C_{13}H_{21}ClN_2O_4$ and structurally represented by

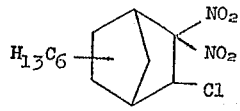

*Analysis.*—Calc. for $C_{13}H_{21}ClN_2O_4$: C, 51.22; H, 6.94; Cl, 11.63; N, 9.19; O, 21.00. Found: C, 51.83, 51.84; H, 6.96, 6.97; Cl, 12.10, 12.11; N, 9.31, 9.16; O, 19.70, 19.93.

EXAMPLE VI

*Preparation of 3-Chloro-2,2-Dinitro-5(or 6)-Propylnorbornane*

A mixture of 20 parts of 3-chloro-2-nitroso-5(or 6)-propylnorbornane dimer, prepared by saturating a solution of 5-propylnorbornene with nitrosyl chloride, as described in Example IV, 50 parts of acetic acid, 70 parts of nitric acid and 0.1 part of sodium nitrite is refluxed until the solution becomes a light yellow color. When the solution is cooled to room temperature, two liquid phases form. The mixture is diluted with water and extracted with 159 parts of carbon tetrachloride. The carbon tetrachloride solution is washed successively with water, concentrated sulfuric acid, "cleaning solution" as described in Example IA, water, 5% sodium bicarbonate solution, and 5% potassium hydroxide solution. The solution is dried with calcium chloride and the liquid is decanted. The decantant is treated with alumina and filtered, and the solvent is removed from the filtrate under reduced pressure. The residue is a slightly yellow liquid. The liquid is distilled through a three-inch Vigreux column. A single distillate fraction, B.P. 135° C./0.12–0.25 mm., is collected. The product is a viscous, slightly yellow liquid, $n_D^{25}=1.477(0)$, $d=1.29$ g./cm.$^3$, molecular refractivity=59.4 and dielectric constant=36. Analyses are consistent with the composition 3-chloro-2,2-dinitro-5(or 6)-propylnorbornane having the empirical formula $C_{10}H_{15}ClN_2O_4$ and represented structurally by

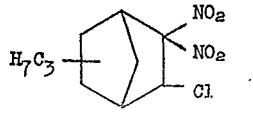

*Analysis.*—Calc. for $C_{10}H_{15}ClN_2O_4$: C, 45.72; H, 5.76; Cl, 13.50; N, 10.66; O, 24.36. Found: C, 45.91; H, 5.86; Cl, 13.50; N, 10.52; O, 24.16.

EXAMPLE VII

*Preparation of 3-Chloro-2,2-Dinitrotrimethylenenorbornane*

A solution of 53 parts of trimethylenenorbornene in 100 parts of acetic acid is saturated with nitrosyl chloride. Concentrated nitric acid (142 parts) is added and the mixture is refluxed. The solid dissolves slowly. When the solution is homogeneous, the mixture is cooled and two liquid phases appear. The mixture is diluted with water and extracted with two portions of carbon tetrachloride. The carbon tetrachloride extracts are combined and washed successively with water, concentrated sulfuric acid, "cleaning solution" as described in Example IA, concentrated sulfuric acid, water, 5% sodium bicarbonate solution, and 5% potassium hydroxide solution. The solution is dried wth calcium chloride, stirred with alumina and filtered. A clear yellow filtrate is obtained. After evaporation of the solvent, a viscous liquid remains which is dissolved in hot ether and crystallized. Hard white crystals melting over the range 78.8–82.5° C. are obtained. The product is identified as 3-chloro-2,2-dinitrotrimethylenenorbornane whose structural formula is represented by

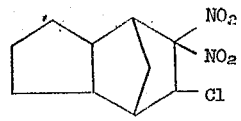

*Analysis.*—Calc. for $C_{10}H_{13}ClN_2O_4$: C, 46.07; H, 5.03; Cl, 13.60; N, 10.75; O, 24.55. Found: C, 45.86; H, 5.04; Cl, 13.64; N, 10.69; O, 24.57.

EXAMPLE VIII

*Preparation of 3-Chloro-5,5,6,6-Tetrafluoro-2,2-Dinitronorbornane*

5,5,6,6-tetrafluoronorbornene (20 parts) is dissolved in 450 parts of chloroform and the solution is saturated with nitrosyl chloride. The crystals which separate out on standing are filtered and washed with chloroform. The crystals are identified as the 3-choloro-5,5,6,6-tetrafluoro-2-nitrosonorbornane dimer which melts with decomposition at about 175° C.

The nitrosonorbornane dimer (101 parts) is suspended in 568 parts of concentrated nitric acid containing 0.1 part of sodium nitrite and the suspension is heated until a homogeneous solution forms. After cooling the solution is diluted with 2000 parts of water. A small quantity of oil appears which is separated from the aqueous layer and dissolved in carbon tetrachloride. The carbon tetrachloride solution is washed with water and with 5% sodium bicarbonate solution, diluted with 50 parts of petroleum ether and dried over sodium sulfate. The clear, light-yellow solution thus obtained is passed through an alumina column. The column is washed with a 1:1 petroleum ether-carbon tetrachloride solution and the pale yellow effluent is again chromatgraphed on alumina. Elution is carried out with carbon tetrachloride, and solvent is removed from the eluate under reduced pressure to give a white solid. The solid is purified further by sublimation at 100° C. under vacuum. The sublimate is a white, waxy solid, identified by analyses as 3-chloro-5,5,6,6-tetrafluoro-2,2-dinitronorbornane, having the structural formula

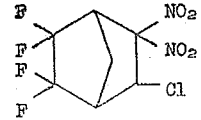

The compound has a dielectric constant in excess of 16, measured at 25° C. and 1800 cycles per second.

*Analysis.*—Calc. for $C_7H_5ClF_4N_2O_4$: C, 28.73; H, 1.72; Cl, 12.12; F, 25.97; N, 9.58. Found: C, 28.55; H, 2.71; Cl, 12.16; F, 26.20; N, 9.54.

EXAMPLE IX

*Preparation of 3-Chloro-5(or 6)-Cyano-2,2-Dinitronorbornane*

Gaseous nitrosyl chloride is bubbled through a cooled solution of 23.8 parts of 5-cyanonorbornene in 100 parts of acetic acid. When the solution is saturated, the mixture is allowed to warm to room temperature and 85 parts of concentrated nitric acid is added. The mixture is heated rapidly to 105° C. and when the evolution of nitrogen dioxide ceases, the now homogeneous solution is poured onto ice. A green gum separates which is dissolved in chloroform and washed with 5% sodium hydroxide solution. The washed solution is dried with sodium sulfate, the solvent is removed under vacuum, and a light yellow viscous liquid remains. The liquid is dissolved in benzene and chromatographed on alumina to remove ketone impurities. Stripping the solvent from the effluent yields a yellowish grease, which is slurried with benzene. A white powder separates which is recrystallized twice from boiling benzene and dried over phosphorus pentoxide at 80° C. under vacuum. The compound melts at 189° C. (sealed tube). Infrared spectra show the presence of nitro and cyano groups, and analyses are consistent with those calculated for 3-chloro-5(or 6)-cyano-2,2-dinitronorbornane structurally represented by

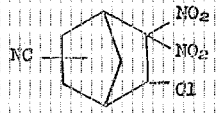

EXAMPLE X

*Preparation of 3-Chloro-5,6-Dimethoxycarbonyl-2,2-Dinitronorbornane*

5,6-dimethoxycarbonylnorbornene is dissolved in an equal volume of methanol and while maintaining the temperature below room temperature, the solution is saturated with nitrosyl chloride. After standing for several hours, a crop of crystals is filtered from the blue solution. The crystals are identified as the nitroso dimer, 3 - chloro - 5,6 - dimethoxycarbonyl-2-nitrosonorbornane. The nitroso compound (37.5 parts) and 92 parts of concentrated nitric acid are heated together to reflux. When the evolution of nitrogen dioxide ceases, the mixture is allowed to cool to room temperature. The yellow supernatant is decanted, and the residual solid is heated to boiling with water and allowed to stand overnight. The solid is washed with water and dried over potassium hydroxide. After recrystallization several times from benzene, a product melting over the range 167.2 to 169° C. is obtained. Analyses are in agreement with the composition $C_{11}H_{13}ClN_2O_8$, further identified spectrophotometrically as 3-chloro-5,6-dimethoxycarbonyl-2,2-dinitronorbornane having the structure

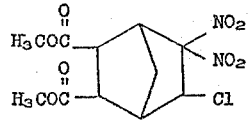

*Analysis.*—Calc. for $C_{11}H_{13}ClN_2O_8$: N, 8.32; Cl, 10.53; O, 38.02. Found: N, 8.50; Cl, 10.33; O, 38.16.

A wide variety of norbornene starting materials may be used in the preparation of the novel 3-chloro-2,2-dinitronorbornane compounds. The following norbornene compounds represented structurally by the formula can be used in this invention:

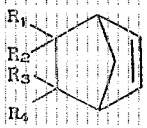

wherein $R_1$, $R_2$, $R_3$ and $R_4$ are monovalent substituents including hydrogen, chloro, fluoro, cyano, alkyl of 1 to 6 carbon atoms, e.g., methyl, ethyl, butyl, pentyl, hexyl, alkoxycarbonyl, e.g., methoxycarbonyl, ethoxycarbonyl, etc. Another useful norbornene starting material is a cyclic norbornene, e.g., trimethylene-, tetramethylene-, pentamethylene-, and hexamethylenenorbornene represented in the above formula where one of the members $R_1$ and $R_2$ and one of the members $R_3$ and $R_4$ when taken together form an alkylene group of 3 to 6 carbon atoms, the other member of $R_1$ and $R_2$ and $R_3$ and $R_4$ being hydrogen. All combinations of norbornene starting materials are possible, i.e., $R_1$ to $R_4$ can be the same or a different substituent, e.g., hydrogen, halogen, alkyl, alkoxycarbonyl, etc. Additional norbornene compounds, in addition to those set forth above, and their 3-chloro-2,2-dinitrobornane derivatives are listed in the following table.

TABLE I

| Norbornene | Chlorodinitronorbornane Product | |
|---|---|---|

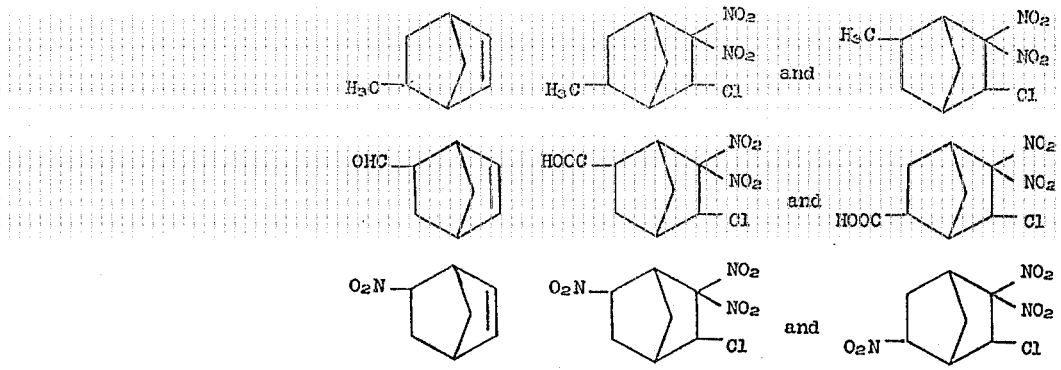

Certain of the substituents contained on the norbornene may in themselves be sensitive to oxidation and in the course of the process will be converted to their oxidation analogs. In such cases, the 3-chloro-2,2-dinitronorbornane products will contain the substituents in their oxidized forms. Illustrated in Table I is the situation in which 6-formylnorbornene is chloronitrosated and oxidized according to the process of this invention to yield the 3-chloro-2,2-dinitro-5(or 6)-norbornanecarboxylic acid as the final product. In addition, 3-chloro-2,2-dinitronorbornanes having oxidation sensitive or other substituents are obtained by employing known synthetic techniques. For example, 3-chloro-2,2-dinitronorbornane amides may be obtained by reacting 3-chloro-2,2-dinitronorbornanecarboxylic acid esters with ammonia; the amides may be dehydrated by phosphorus oxychloride to the corresponding nitriles; 3 - chloro-2,2-dinitronorbornanecarboxylic acid esters may be hydrolyzed to the carboxylic acids; acid chlorides may be prepared by reacting the 3-chloro-2,2-dinitronorbornanecarboxylic acids with phosphorus trichloride. Still other derivatives of norbornene can be prepared by procedures known in the art and then converted to the 3-chloro-2,2-dinitronorbornane derivative.

Each of the products embodying the present invention may comprise a mixture of stereoisomers, depending upon the characteristics of the starting materials and the reaction. Such mixtures may include isomers wherein the substituents are in cis-trans and/or endo-exo geometric relationship. Theoretical considerations supported by experimental evidence indicate that each of the isomers will have high dipole moments. It is accepted theory that such polar molecules which are rotatable in response to an electric field provide high dielectric constants.

Certain of the isomers and mixtures of isomers of the 3-chloro-2,2-dinitronorbornanes of this invention have molecules capable of rotation in an electric field at room temperature. These are the waxy products or liquid products as exemplified in 3-chloro-2,2-dinitronorbornane and 3-chloro-2,2-dinitro-5-propylnorbornane having dielectric constants of 30 and 36, respectively, at 25° C. Others of the solids, especially the hard, crystaline compounds obtained by the process of this invention, have little tendency to rotate in the solid state, however. It is believed that the rotational tendency of these latter molecules is not sufficiently great to overcome the crystalline forces resisting rotation. Solids of this type, however, show their dielectric properties as predicted by theory when the crystalline forces are overcome, for instance, by melting, dissolution, formulation with other substances, and the like. This is true with a substance such as 3-chloro-2,2-dinitrotrimethylenenorbornane. Its measured dielectric constant is about 3 at room temperature; its melt and super-cooled liquid have a dielectric constant in excess of 20, and solutions in castor oil have dielectric constants considerably in excess of that of castor oil alone.

In the preparation of the 3-chloro-2,2-dinitronorbornanes, nitrosyl chloride is the preferred reagent for the chloronitrosation reaction and its use has been described above in detail. Other reagents capable of generating nitrosyl chloride may be employed, however, if desired. A mixture of amyl nitrite and hydrochloric acid, for example, is suitable for the reaction. Ordinarily, the chloronitrosation proceeds with greater efficiency in homogeneous systems and hence reactions involving solid norbornenes preferably are carried out in solvents such as acetic acid, liquid sulfur dioxide, ethanol, chloroform, and the like. Preferred reaction temperatures are within the range —5 to 25° C., although the application of higher and lower temperatures is limited only by reaction rate or decomposition of the desired product.

A wide variety of nitric acid solutions may be employed for the subsequent oxidation and nitration of the chloronitrosonorbornane intermediates. For instance, aqueous solutions whose concentrations range from 35% by weight nitric acid to fuming nitric acid are suitable. Solutions of nitric acid in acetic acid, in comparable concentration ranges, are also operable in the process. Another oxidizing medium which may be employed for the oxidation and nitration reaction is nitrogen dioxide. Nitrogen dioxide bubbled through acetic acid containing the chloronitroso adducts is especially suitable. A trace of sodium nitrite may also be employed in the reaction mixtures as catalyst if desired. The oxidation-nitration is preferably carried out within the temperature range 45 to 110° C., reflux temperatures being the most convenient. The reaction mixtures are heated until evolution of the oxides of nitrogen ceases.

The method employed for the purification of the 3-chloro-2,2-dinitronorbornanes is in no way critical to the invention. Purification procedures are devised primarily for the removal of ketone impurities formed as secondary products in the oxidation reactions. Acidic washes have been employed successfully, utilizing reagents such as the "cleaning solution" described in Example IA, sulfuric acid and the like. Alternatively, the ketone may be reduced with a reducing agent such as sodium borohydride to provide a water-soluble product; the products may be separated chromatographically or by other equivalent means.

The novel products of this invention are liquids, waxes or hard, crystalline solids. Determination of the dielectric constants of the liquids and solids at 25° C. and a frequency of 1000 cycles per second indicate that these have excellent dielectric properties. A summary of electrical properties of some of the preferred compounds as determined by capacitance measurements on a high voltage bridge are as follows:

TABLE II

| Compound | Dielectric Constant | Dissipation Factor |
|---|---|---|
| 3-Chloro-2,2-dinitronorbornane (wax) | 30 | $9 \times 10^{-4}$ |
| 3-Chloro-2,2-dinitro-5-propylnorbornane (liquid) | 36 | $4 \times 10^{-3}$ |
| 3-Chloro-2,2-dinitro-5,5,6,6-tetrafluoronorbornane (wax) | >16 | $5 \times 10^{-4}$ |
| 3-Chloro-2,2-dinitrotrimethylenenorbornane (melt) | >20 | 4 |

The products may be employed as dielectrics in electrical apparatus for which their electrical and physical characteristics render them useful. For instance, the waxes and liquids may be used as capacitor impregnants or as dielectric media in the construction of electroluminescent cells. Conventional electroluminescent cells comprise a phosphor embedded in a dielectric matrix sandwiched between a pair of conducting layers, at least one of which is transparent or light transmitting. When an alternating voltage is applied across the conductive layers, the phosphor produces light. Tests of electroluminescent cells employing 3-chloro-2,2-dinitronorbornane as the dielectric matrix into which a phosphor such as zinc sulfide is suspended indicate their higher brightness over similar cells containing dielectric matrices such as nitrocellulose, cyanoethylcellulose, castor wax and the like.

In addition to their use per se, the 3-chloro-2,2-dinitronorbornanes may be used in special formulations for particular needs. Of especial interest are formulations containing these compounds dissolved in various oils. For example, a solution containing 1 part by weight of 3-chloro-2,2-dinitrotrimethylenenorbornane in 10 parts by volume of castor oil has a dielectric constant about sixty percent higher than that of castor oil alone. Such solutions may be employed as special capacitor fluids, capacitor impregnants, plasticizers, etc.

The novel compounds of this invention are advantageous because they have high dielectric properties and they can be used in conjunction with other materials to improve the dielectric properties. Still other advantages will be apparent to those skilled in the art.

What is claimed is:

1. A 3-chloro-2,2-dinitronorbornane of the formula:

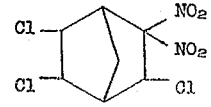

wherein $R_1$, $R_2$, $R_3$ and $R_4$ are members selected from the group consisting of hydrogen, chlorine, fluorine, cyano, alkyl, alkoxycarbonyl, and one of said members $R_1$ and $R_2$ and one of said members $R_3$ and $R_4$ when taken together form an alkylene group of 3 to 6 carbon atoms, the other member of $R_1$ and $R_2$ and $R_3$ and $R_4$ being hydrogen.

2. 3-chloro-2,2-dinitronorbornane represented by the formula:

3. 3,5,6-trichloro-2,2-dinitronorbornane of the formula:

4. Dichloro-2,2-dinitronorbornane of the formula:

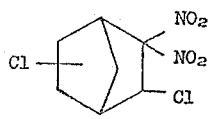

5. 3-chloro-2,2-dinitropropylnorbornane of the formula:

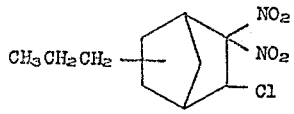

6. 3-chloro-2,2-dinitrohexylnorbornane of the formula:

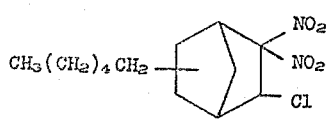

7. 3-chloro-5,5,6,6-tetrafluoro-2,2-dinitronorbornane of the formula:

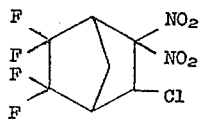

8. 3-chloro - 5,6-trimethylene-2,2-dinitronorbornane of the formula:

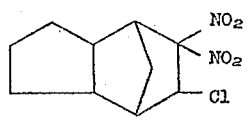

9. 3-chlorocyano-2,2-dinitronorbornane of the formula:

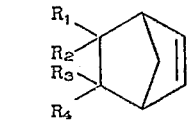

10. 3-chloro - 5,6-dimethoxycarbonyl - 2,2 - dinitronorbornnane of the formula:

11. A process for the preparation of a 3-chloro-2,2-dinitronorbornane which comprises reacting a norbornene of the formula:

wherein $R_1$, $R_2$, $R_3$ and $R_4$ are members selected from the group consisting of hydrogen, chlorine, fluorine, cyano, alkyl, alkoxycarbonyl, and one of said members $R_1$ and $R_2$ and one of said members $R_3$ and $R_4$ when taken together form an alkylene group of 3 to 6 carbon atoms, the other member of $R_1$ and $R_2$ and $R_3$ and $R_4$ being hydrogen, with a chloronitrosating agent forming a chloronitrosonorbornane adduct of said norbornene, oxidizing and nitrating the chloronitrosonorbornane with a member selected from the group consisting of nitrogen dioxide and nitric acid forming the 3-chloro-2,2-dinitronorbornane derivative and separating said norbornane derivative.

12. A process as defined in claim 11 wherein said chloronitrosating agent is nitrosyl chloride.

No references cited.